Jan. 10, 1933.  G. R. CRUZE  1,893,537
FASTENING DEVICE FOR SHEET METAL STRUCTURES
Filed Feb. 3, 1932
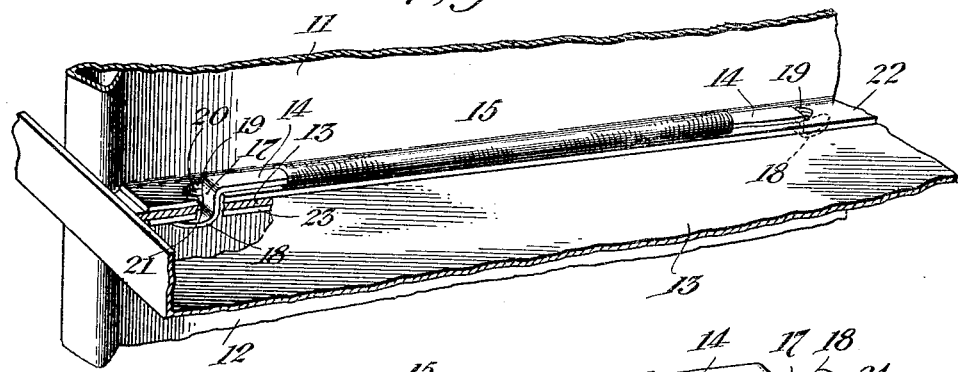
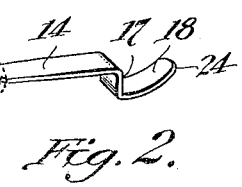
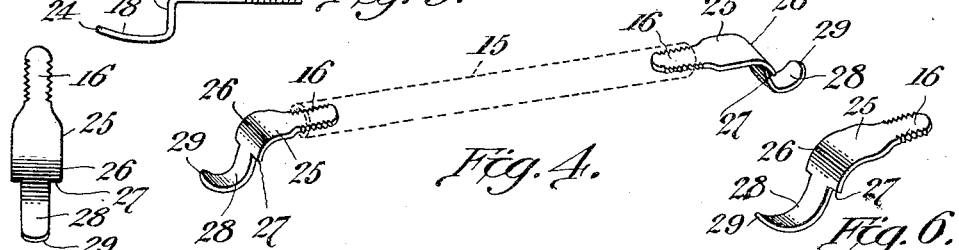
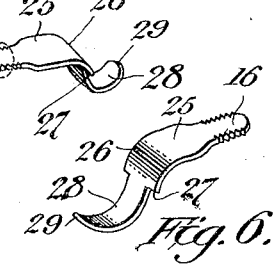
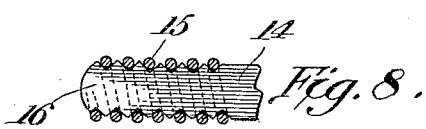
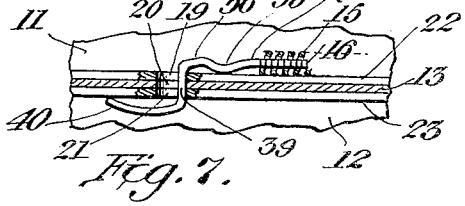
Inventor,
George R. Cruze.
By
Attorney Patented Jan. 10, 1933

1,893,537

UNITED STATES PATENT OFFICE

GEORGE R. CRUZE, OF DANVILLE, PENNSYLVANIA

FASTENING DEVICE FOR SHEET METAL STRUCTURES

Application filed February 3, 1932. Serial No. 590,721.

The present invention relates to fastening devices for sheet metal structures and consists in the combinations and arrangements of elements hereinafter described and particularly set forth in the accompanying claims.

The invention has for its purpose to provide a novel form of fastening for sheet metal furniture, e. g. bins for storing parts in garages, or shelving and partitions for store service, which may be readily applied by a single person and without the employment of tools, and which will securely and firmly hold the sections in their assembled relation, and one that may be employed with present used furniture of this type without making any alterations therein.

The present used nut and bolt fastenings for sheet metal furniture is unsatisfactory and impracticable in the following respects: Much trouble and time are necessary for installing or taking down; the parts are not held in proper rigid assembly; and not infrequently two men are required for putting up or taking down the units or sections, i. e. one to hold the nut and the other the bolt; and finally, that type of fastening is inconvenient to use and too complicated for its simple purpose. To avoid these defects the present invention provides a single and simply constructed device which takes the place of the two-part nut and bolt fastening, and can be employed with present types of this furniture having either the slotted or hole-shaped aperture. The same may be alternatively used in shelving or partitions, and wherever used lies perfectly flat and non-obstructive.

The invention is shown by way of illustration in the accompanying drawing, wherein:

Figure 1 shows the application of the device, partly in section, to a partition and shelf construction of the bin type used in garages.

Figure 2 a perspective view of the device per se showing the tensioning spring in diagram.

Figure 3 a side elevational view of one of the fasteners employed.

Figure 4 a view similar to Figure 2 showing a modified type of fastener.

Figure 5 a front elevational view of the fastener employed in Figure 4.

Figure 6 a perspective view thereof.

Figure 7 a detail view showing another form of fastener in applied position, and;

Figure 8 illustrates in enlarged section the novel manner of connecting the fastening device to the tensioning spring.

Referring to the construction in further detail and wherein like reference characters designate corresponding parts in the different figures shown, 11 and 12 represent the respective upper and lower sections of a partition in bin structures having the shelf or horizontal portion 13, and which parts are assembled in the usual way and rigidly held together by the novel form of fastening means herein disclosed.

The fastening device per se consists of two similar members or resilient clips 14 held in tension by the spring 15 and into the open ends of which spring said clips have screw engagement by the notched shank portion 16 as clearly shown in Figures 2 and 8. Each of said clips has its shank portion elongated, is bent substantially at right angles as at 17 providing opposed shoulders, and has a terminating and curved portion 18 forming a wedge or clamping element.

In applied position the device is fitted in the manner shown in Figure 1 (also in Figure 7) wherein the curved portions 18 of the two tensioned clips freely pass through the three registering apertures 19, 20 and 21 formed respectively in the flange 22 of partition member 11, shelf 13, and flange 23 of the lower partition 12 (see Figure 7). In this relation the tension spring 15 firmly holds the clips and the upturned or tip ends 24 thereof effect the desired clamping action for holding the parts rigid and in assembled relation.

In the construction shown in Figures 4, 5 and 6, the manner of adjustment and function of the device is in all essentials the same as that described above. In this instance, however, each clip 25 has a curved portion 26 cut-away to provide shoulders at 27 terminating in a reduced and curved part 28 as shown. In the application of this type of fastening said shoulders 27 bearing against the ledge 22 of the upper partition part 11 causes the aperture engaging portion 28 to bind its upturned end 29 tightly against the under side of ledge 23 and thereby the several parts 11, 12 and 13 are held in assembled and rigid relation.

In the arrangement shown in Figure 7 the clip 36 has its shank 37 slidably curved or bent as at 38 providing an element that binds against the flange 22 of partition 11 and the angular portion 39 of said clip and its terminal 40 are constructed in all respects similar to and function the same as the corresponding parts of 17, 18 and 24 of the device described in Figures 1 and 2. In this construction, however, (i. e. Figure 7) the tensioning spring causes the portions 38 and 40 to tightly bind against the respective flanges of the upper and lower partition parts and in effect produce opposed clamping actions against their engaging parts and rigidly hold the same in assembled relation.

It is to be understood the invention is not limited to the precise details of construction and arrangement herein disclosed, as it is obvious various modifications may be made therein without departing from the essential features of the invention.

What is claimed as new is:

1. A fastener of the character described comprising opposed and independent members having angular portions adapted to engage within registering apertures of the parts to be held in position, the free ends of said angular portions being appreciably upturned and binding against the surface of the adjacent parts, and resilient means connecting said members and holding the same in their respective engaging positions, substantially as set forth.

2. A fastener of the character described comprising opposed and independent members having angular portions adapted to engage within registering apertures of the parts to be held in position, the free ends of said angular portions being appreciably upturned and binding against the surface of the adjacent part, and resilient means connecting and drawing said members together for holding the same in their respective engaging positions, substantially as set forth.

3. A fastener of the character described comprising a pair of members having opposed angular and shoulder portions and adapted to engage within registering apertures of the parts to be held in position, the free ends of said angular portions being appreciably upturned and binding against the surface of the adjacent parts, and resilient means connecting said members and holding the same in their respective engaging positions, substantially as set forth.

4. A fastener of the character described comprising a pair of independent members having angular and off-set portions adapted to engage within registering apertures of the parts to be held in position, the free ends of said angular portions being appreciably upturned and binding against the surface of the adjacent parts, and resilient means connecting said members and holding the same in their respective engaging positions, substantially as set forth.

5. A fastener of the character described comprising opposed independent angular members adapted to engage within registering apertures of the parts to be held in position, the free ends of said angular members being appreciably upturned and binding against the surface of the adjacent parts, and a spiral spring having threaded connection with said members and holding the same in their respective engaging positions, substantially as set forth.

6. A fastener of the character described comprising opposed independent angular members adapted to engage within registering apertures of the parts to be held in position, the free ends of said angular members being appreciably upturned and binding against the surface of the adjacent parts, said members having notched shank portions; and a spiral spring having screw engagement with said shank portions and holding the members in their respective positions, substantially as set forth.

7. A fastener of the character described comprising a pair of independent members of resilient metal having opposed angular portions adapted to engage within registering apertures of the parts to be held in position, the distal free ends of said angular portions being appreciably upturned and binding againt the surface of the adjacent parts, and resilient means connecting said members and holding the same in their respective engaging positions, substantially as set forth.

In testimony whereof, I affix my signature.

GEORGE R. CRUZE.